July 30, 1935.  R. S. BEGG  2,009,723
BRAKE
Filed Sept. 29, 1931

Inventor
RUSSELL S. BEGG

By Richey & Watts
Attorneys

Patented July 30, 1935

2,009,723

UNITED STATES PATENT OFFICE 2,009,723

BRAKE

Russell S. Begg, Cleveland, Ohio, assignor to The Midland Steel Products Company, Cleveland, Ohio, a corporation of Ohio Application September 29, 1931, Serial No. 565,735

13 Claims. (Cl. 188—78)

This invention relates to brakes for automotive vehicles and has to do, more particularly, with an anti-rattling device.

In certain automotive vehicle brakes of the internal expanding type, the ends of the shoe are separated by means of a cable-actuated toggle mechanism. The ends of the toggle are connected to thrust pins mounted at the ends of the shoe and, when the toggle is spread, the lateral thrust on the shoe is taken through the apron by means of rollers disposed on the thrust pin.

Ordinarily the rollers are loosely mounted and there is a marked tendency on the part of these rollers to rattle when the shoe is in idle or unexpanded position. This is extremely noticeable when the vehicle is coasting, and since the advent of "free wheeling" the noise is apt to be frequent and particularly annoying.

It is my intention to obviate this objectionable rattle of the rollers by providing means for resiliently holding the rollers in position.

It is one object of this invention to provide a spring washer which bears against the rollers and prevents the rattling thereof. It is another object of this invention to prevent the rattling of such rollers at all times. Other objects and advantageous features of this invention will be noted in the accompanying drawing and detailed description wherein like characters of reference designate like parts, and wherein.

Figure 1:
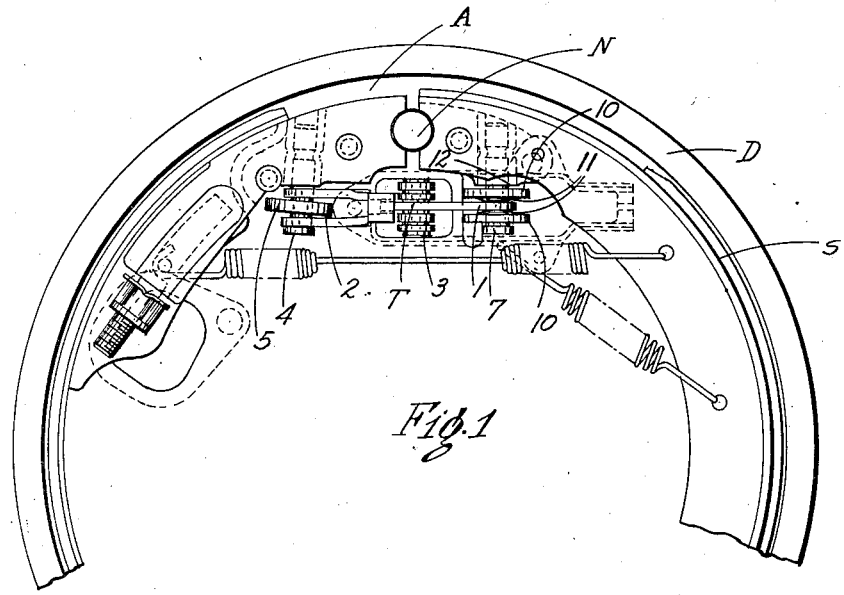
Figure 1 illustrates an assembly of the brake shoe, including a toggle mechanism for expanding such shoe with my preferred form of anti-rattle device mounted with the rollers on the rigid side of the shoe.

In the drawing, I illustrate a well known type of brake mechanism wherein I show a brake apron A adapted to be carried by an axle or steering knuckle of a motor vehicle. The brake drum D is of the usual type and is carried by the vehicle wheel. Secured to the apron A is an anchor N against which the ends of the brake shoe S abuts. I provide shoe spreading mechanism such as a toggle T actuable through a cable adapted to be operated through the foot pedal of the automotive vehicle to expand the toggle mechanism.

The toggle mechanism consists of a male arm 1 and a female arm 2, both of which are connected at their inner ends to the toggle pivot pin 3. The female arm is connected to a thrust pin 4 mounted at one end of the brake shoe and is provided with a bifurcated portion which lies on either side of the roller 5 mounted on the thrust pin. The male arm 1 is connected at its free end to the thrust pin 7 identical with the thrust pin 4. Rollers 13 are mounted on the thrust pin 7 on either side of the male arm.

Figure 2:
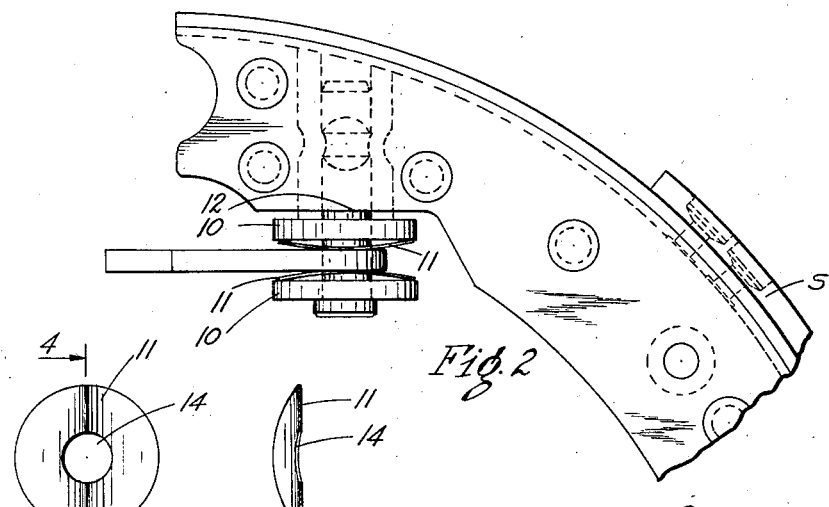
Figure 2 is an enlarged view of the end of the shoe having the rollers and anti-rattling washers.
Figure 3:
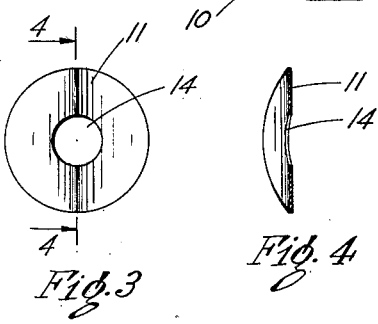
Figure 3 is a plan view of the anti-rattle washer.
Figure 4:
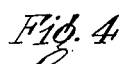
Figure 4 is a section taken on the line 4—4 of Fig. 3.

Heretofore, no means had been provided for holding these rollers in place and they may have tended to oscillate along the thrust pin and produce objectionable noises when the brake mechanism was in idle or inoperative position. When the toggle mechanism is expanded the lateral thrust on the pins is taken through the apron by means of the rollers which engage therewith, which engagement of course tends to prevent rattle thereof. However, as hereinbefore mentioned, when the shoe is at rest the rollers and toggle links tend to rattle. To overcome this objectionable noise, I have provided the spring washers 11, Figs. 1, 2 and 3, which are interposed intermediate the rollers and the male arm 1. These spring washers may be stamped out of suitable metal and tempered in concavo-convex contour, Fig. 4. They are provided with suitable central apertures 14 to permit mounting thereof on the thrust pins. When mounted on the thrust pin 7, the convex side of the spring washer faces the roller.

The spring washers however, are not of sufficient strength to hinder the free rotation of the rollers when in engagement with the apron A, nor interfere with the normal operation of the expanding mechanism. They serve to reduce wear on the thrust pin and on the male arm by holding the rollers firmly but resiliently in place.

In some instances, it has been found that the roller 2 will set up an objectionable rattle. To overcome this, the spring washers 11a, which are identical in every respect with the washers 11, may be placed intermediate the bifurcated end of the female toggle arm and the roller 5. This roller, however, does not ordinarily tend to rattle in certain positions owing to the angular relationship that exists between the female arm 2 and thrust pin 4, all of which has been described and set out in the claims of my co-pending application, Serial No. 543,312, filed June 10, 1931.

Figure 5:
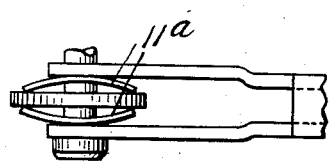
Figure 5 is a view showing the anti-friction device associated with the female toggle arm of the spreader mechanism.
Figure 6:
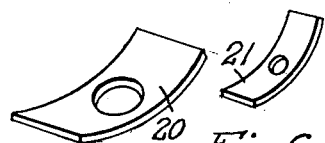
Figure 6 is a view of a slightly modified form of anti-rattling device.

Although I have shown the spring washer as taking the form of an annulus, it will be quite apparent that these washers may be square or rectangular, or may consist of a single strip of material curved in the direction of its length and apertured for mounting on the thrust pin, as disclosed in Fig. 5; the reference numeral 20 indicating a square washer, and 21 the rectangular or elongated strip curved in the direction of its length and apertured for mounting on the thrust pin.

While the foregoing sets out a preferred embodiment of my invention it is understood that I am not to be limited in the scope thereof other than by the claims appended hereto.

I claim:

1. In a brake shoe having separable ends, thrust pins supported by said ends, rollers mounted on said pins, anti-rattling devices engaging with said rollers, and means engaged by said devices and associated with said pins for expanding said brake shoe.

2. In a brake the combination of shoe parts having separable ends, pins mounted at the ends of said brake shoe, anti-friction devices mounted on said pins, anti-rattling devices engaging said anti-friction devices, and means for separating said shoe ends.

3. In a brake, the combination of an apron, a split brake shoe lying adjacent thereto and being made up of T-section stock, thrust pins mounted at the ends of said shoe lying alongside the leg of the T, rollers mounted on said thrust pins for spacing said shoe from said apron, anti-friction devices mounted on said thrust pins, at least one of said anti-friction devices having an anti-rattling device associated therewith and toggle mechanism for expanding said brake shoe engaging said thrust pins and coacting with said anti-rattling device.

4. The combination of an apron, a T-section brake shoe having separable ends, thrust pins mounted at said ends alongside the leg of the T and having rollers disposed thereon below the end of the T for spacing said shoe from said apron, resilient means mounted on said thrust pins and engaging at least two of said rollers for limiting the axial movement thereof along said thrust pins, and means for expanding said brake shoe connected to said thrust pins.

5. In a brake, an apron, a brake shoe disposed adjacent thereto, said brake shoe carrying a thrust pin having rollers mounted thereon, and anti-rattling devices associated with said rollers and said pin.

6. In a brake, an apron, a drum, a brake shoe disposed adjacent said apron and having separable ends, and an anchor against which one end of said shoe is adapted to anchor when the drum is rotated in one direction, and against which the other of said ends is adapted to anchor when the brake drum is traveling in a reverse direction, a cable actuated toggle for expanding said brake band, thrust pins mounted on said brake shoe and connected to said toggle, anti-friction rollers mounted on said thrust pins and adapted to transmit the lateral thrust of said toggle to said apron, and an anti-rattling device associated with at least one of said rollers and the part of the toggle adjacent thereto.

7. The brake shoe comprising a flat curved lining supporting portion having an integral radial rib and having separable ends, thrust pins mounted at the ends of said shoe, a toggle mechanism for separating said brake shoe connected to said thrust pins, anti-friction rollers mounted on one of said thrust pins and lying on opposite sides of said toggle mechanism and resilient means interposed intermediate said toggle mechanism and said anti-friction devices for preventing the rattling of said anti-friction device.

8. In combination, brake shoe means having separable end parts, thrust pins mounted on said end parts, means for separating said end parts consisting in a toggle having a pair of arms pivotally connected together, each of which engages one of said thrust pins, one of said arms having rollers mounted on opposite sides thereof and on one of said thrust pins, and a spring washer mounted between said arm and at least one of said rollers.

9. In combination, a brake shoe made up of T-section stock and having separable ends, means for expanding said shoe which consists in a toggle mechanism, means for connecting said toggle to said brake shoe, rollers mounted on said means and resilient means associated with said rollers and reacting between said rollers and at least part of said toggle mechanism.

10. In a brake, an apron, a brake shoe disposed adjacent to said apron and having separable ends, a toggle mechanism for expanding said brake shoe, thrust pins for connecting said toggle mechanism to said brake shoe, rollers mounted on said thrust pins and adapted to engage with said apron when said shoe is expanded to transmit lateral thrust thereto, and a convex-concavo disc associated with at least one of said rollers for preventing the rattling thereof when said shoe is in an inoperative position.

11. In a brake, the combination of a brake shoe having a thrust pin disposed adjacent one end thereof, said thrust pin having at least one anti-friction device mounted thereon, and an anti-rattling device associated with said thrust pin and said anti-friction device.

12. In a brake shoe, thrust pins supported by the ends of said bake shoe, rollers mounted on said thrust pins, anti-rattling devices mounted on said thrust pins and engaging with at least one of said rollers, said anti-rattling device being resilient and urging said anti-rattling rollers axially of the pin.

13. In a brake, a brake shoe having separable ends, thrust pins supported by said ends, expanding means engaged with said pins for expanding the brake shoe, and anti-rattling devices engaging said pins and expanding means.

RUSSELL S. BEGG.